(12) United States Patent
Ferguson et al.

(10) Patent No.: US 8,442,882 B1
(45) Date of Patent: May 14, 2013

(54) METHOD AND SYSTEM FOR MANAGING CHARITABLE DONATIONS

(75) Inventors: Lisa Anne Ferguson, San Diego, CA (US); David Jeffrey Snow, San Diego, CA (US); Vidya Dinamani, San Diego, CA (US); Joseph Elwell, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 671 days.

(21) Appl. No.: 12/359,089

(22) Filed: Jan. 23, 2009

(51) Int. Cl.
*G06Q 40/00* (2012.01)
(52) U.S. Cl.
USPC .............................................................. 705/31
(58) Field of Classification Search ....................... 705/31
See application file for complete search history.

(56) References Cited

U.S. PATENT DOCUMENTS

| | | | |
|---|---|---|---|
| 2002/0133410 A1* | 9/2002 | Hermreck et al. | 705/19 |
| 2005/0097046 A1* | 5/2005 | Singfield | 705/42 |
| 2010/0180187 A1* | 7/2010 | Miller et al. | 715/205 |

* cited by examiner

*Primary Examiner* — Shay S Glass
(74) *Attorney, Agent, or Firm* — Osha Liang LLP

(57) ABSTRACT

A method for managing charitable donations of a donor. The method includes receiving donation information associated with a charitable donation of a donor from a browser extension of a browser application, where the browser application is executing on a user system associated with the donor and where the browser extension obtains the donation information independent of web content presented in the browser application. The method further includes receiving a request for the donation information from a tax preparation entity. The method further includes in response to the request, sending the donation information to the tax preparation entity, where the donation information is used by the tax preparation entity to generate tax documentation for the donor.

28 Claims, 12 Drawing Sheets

| | |
|---|---|
| Name of Donation Recipient 602 | Red Diamond |
| Country of Donation Recipient 603 | United States ▼ |
| Street address of Donation Recipient 604 | 1234 Main Street |
| State of Donation Recipient 606 | MT ▼ |
| City of Donation Recipient 608 | Suburbia |
| Zip Code of Donation Recipient 610 | 99999 |
| Is this a single donation? 612 | ☒ Yes  ☐ No |
| Date of donation 614 | July ▼  29 ▼  2008 ▼ |
| Type of donation? 616 | Item ▼ |
| Description of the item? 618 | Car ▼ |
| Detailed description of item 620 | 1992 Honda Civic EX Sedan |
| Quantity of item 622 | 1 ▼ |
| Condition of item 624 | ☒ Good  ☐ Fair  ☐ Poor |
| Value of item 626 | $1,300.00 |
| Picture of item: 628 | Upload Picture 630   Donated car.jpg (125kb) 632 |
| Copy of receipt: 634 | Upload Receipt 636 |

Save Donation 640   Clear Template 642   Cancel 644

| | |
|---|---|
| Name of Donation Recipient 652 | Red Diamond |
| Country of Donation Recipient 653 | United States ▼ |
| Street address of Donation Recipient 654 | 1234 Main Street |
| State of Donation Recipient 656 | MT ▼ |
| City of Donation Recipient 658 | Suburbia |
| Zip Code of Donation Recipient 660 | 99999 |
| Is this a single donation? 662 | ☒ Yes ☐ No |
| Date of donation 664 | July ▼ 29 ▼ 2008 ▼ |
| Type of donation? 666 | Funds ▼ |
| Description of the funds? 668 | Check (Personal) ▼ |
| Check number: 670 | 6247 |
| Value of donation: 672 | $500.00 |
| Copy of cancelled check: 676 | Upload Picture 678 |
| Copy of receipt: 682 | Upload Receipt 684   Donation receipt.pdf (23kb) 686 |

Save Donation 688   Clear Template 690   Cancel 692

METHOD AND SYSTEM FOR MANAGING CHARITABLE DONATIONS

BACKGROUND

Many taxpayers donate items, time, securities, and funds, and most of these taxpayers use the value of these donations to help reduce the amount of taxes owed on their tax returns. The government recognizes donations as deductible items for tax purposes, but some minimum information about the donation, such as the date of the donation, the name and address of the recipient of the donation, and the value of the donation, is required. In addition, some form of documentation for these donations may be required.

Typically, taxpayers manually track donation information. For example, donation records may be in the register of a checkbook, others in a file in a drawer, others in an electronic file on a computer, and still others on loose papers in a shoebox. In such cases, the taxpayer manually tracks and consolidates the donation records in the various locations in order to prepare tax documentation.

In some cases, taxpayers may use software applications to assist in tracking the donation records. However, the taxpayer is still required to manually enter the donation records and file physical documentation related to the donation. Further, the taxpayer may also use the software applications for recommendations to determine the tax consequences of particular donations.

SUMMARY

In general, in one aspect, the invention relates to a method for managing charitable donations of a donor. The method includes receiving donation information associated with a charitable donation of a donor from a browser extension of a browser application where the browser application is executing on a user system associated with the donor and where the browser extension obtains the donation information independent of web content presented in the browser application. The method further includes receiving a request for the donation information from a tax preparation entity. The method further includes sending the donation information in response to the request to the tax preparation entity, where the donation information is used by the tax preparation entity to generate tax documentation for the donor.

In general, in one aspect, the invention relates to a system for managing charitable donations of a donor. The system includes an application interface operatively connected to a browser extension of a browser application, where the browser application is executing on a user system associated with the donor, and the application interface is configured to receive donation information associated with a charitable donation of a donor from the browser extension, where the browser extension obtains the donation information independent of web content presented in the browser application. The application interface is further configured to receive a request for donation information from a tax preparation entity, and in response to the request, send the donation information to the tax preparation entity, where the donation information is used by the tax preparation entity to generate tax documentation for the donor. The system further includes a data repository configured to store the donation information.

In general, in one aspect, the invention relates to a computer readable medium including instructions executable by a computer to perform method steps for managing charitable donations of a donor. The instructions for performing the method include receiving donation information associated with a charitable donation of a donor from a browser extension of a browser application where the browser application is executing on a user system associated with the donor and where the browser extension obtains the donation information independent of web content presented in the browser application. The instructions for performing the method further include receiving a request for the donation information from a tax preparation entity. The instructions for performing the method further include sending the donation information in response to the request to the tax preparation entity, where the donation information is used to generate tax documentation for the donor by the tax preparation entity.

Other aspects of the invention will be apparent from the following description and the appended claims.

BRIEF DESCRIPTION OF DRAWINGS

FIGS. 6A-6B show examples of a template to create a new donation in accordance with one or more embodiments of the invention.

DETAILED DESCRIPTION

Figure 1:
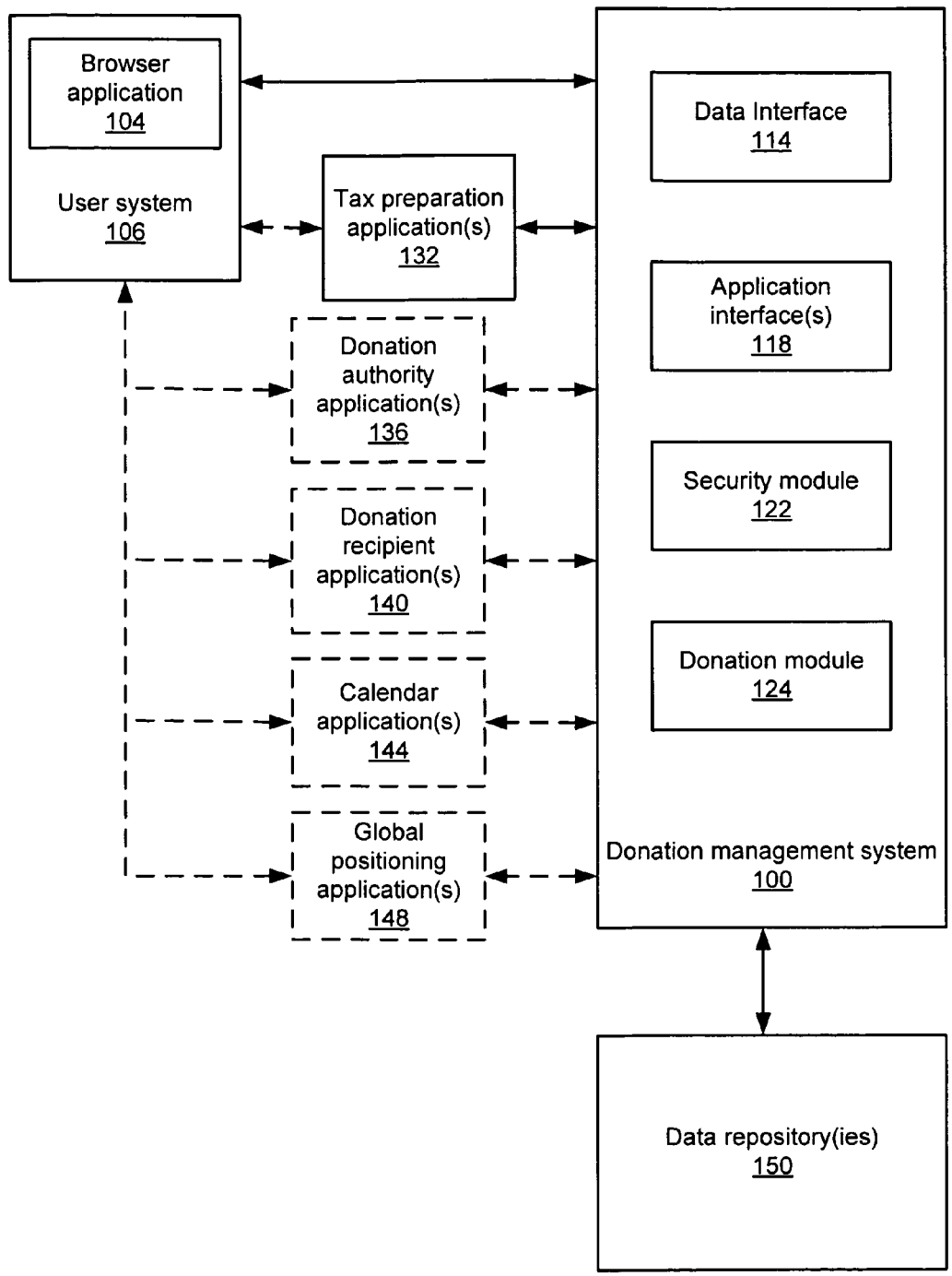
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for managing charitable donations. More specifically, embodiments of the invention provide a method and system to obtain and manage donation information from a browser application, where the browser application obtains the donation information independent of web content presented in the browser application.

FIG. 1 shows a system for managing charitable donations in accordance with one or more embodiments of the invention. The system includes a donation management system (100) interacting with a user system (106) through a browser application (104), which is operatively connected to the user system (106). In addition, the donation management system (100) interacts with tax preparation application(s) (132), and one or more data repositories (150). Optionally, the donation management system (100) may also interact with donation authority application(s) (136), donation recipient application(s) (140), calendar application(s) (144), and global positioning application(s) (148). The donation management system (100) further includes application interface(s) (118), a data interface (114), a security module (122), and a donation module (124), which are each operatively connected to the donation management system (100). Each of these components is described with respect FIG. 1 below. One of ordinary skill in the art will appreciate that embodiments of the invention are not limited to the configuration shown in FIG. 1.

In one or more embodiments of the invention, the user system (106) is configured to interact with the donation management system (100) using a browser application (104). More specifically, the user system (106) may be, or may contain a form of, an internet-based communication device that is capable of communicating with the browser application (104). Examples of user system (106) include, but are not limited to, a desktop computer with internet access, a laptop computer with internet access, a smart phone, and a personal digital assistant (PDA). The user system (106) may be operated by a user, which may include, but is not limited to, an individual, a group, an organization, or some other legal entity. In one or more embodiments of the invention, the user is the donor of charitable donations. Optionally, the user system (106) may interact directly with tax preparation application(s) (132), the donation authority application(s) (136), the donation recipient application(s) (140), the calendar application(s) (144), and the global positioning application(s) (148). For example, in some embodiments, the tax preparation application (132) is executed on the user system (106).

In one or more embodiments of the invention, the browser application (104) is configured to display web page(s) (i.e., web content). More specifically, the browser application (104) is any application capable of rendering Hypertext Markup Language (HTML). For example, the browser application (104) may be a web browser(s) used by the user system (106) to access web pages (i.e., web content) over the Internet (or other Wide Area Network or Local Area Network). The browser application (104) may be executing the user system (106). Further, in one or more embodiments of the invention, the donation management system (100) is configured to interact with the user system (106) through use of notifications. The notifications may be conveyed by electronic mail, short message service (SMS), or some other form of correspondence.

In one or more embodiments of the invention, the browser application (104) provides support for browser extension(s). More specifically, the browser application (104) may provide an open framework for adding features to the browser application (104). In this case, a browser extension may be an application that extends the functionality of a browser application (104) using the open framework. The browser application (104) may interact with the donation management system (100) using the browser extension(s). Further, the browser extension(s) may be configured to interact with a user interface of the browser application (104).

Those skilled in the art will appreciate that the donation management system (100) may also be implemented as a browser extension. In this case, the browser application (104) may interact directly with the donation management system (100) as a browser extension.

In one or more embodiments of the invention, the donation management system (100) is configured to interact with the browser application (104) using the application interface(s) (118). More specifically, the application interface(s) (118) may be configured to receive requests for donation information from the browser application (104). Requests for donation information may specify, but are not limited to, a user system (106), guidance for obtaining the donation information, Uniform Resource Identifier (URI) (e.g., Uniform Resource Locator (URL), web address, etc.), a donation authority application(s) (136), a donation recipient application(s) (140), some other application, or any combination thereof. Those skilled in the art will appreciate that the guidance for obtaining the donation information may include direction(s) and/or location(s) for obtaining the donation information specified in the request.

In one or more embodiments of the invention, the data specified in the requests for donation information corresponds to metadata associated with the requests and/or donation information. Optionally, the requests for donation information may also include additional metadata describing the data specified in the requests for donation information (i.e., provide context for the specified data.) In one or more embodiments of the invention, the donation management system (100) is configured to support various data formats provided by the applications (e.g., browser application (104), tax preparation application (132), donation authority application (136), donation recipient application (140), calendar application (144), and global positioning application (148)).

In one or more embodiments of the invention, the tax preparation application(s) (132) is configured to obtain data for the donation management system (100). More specifically, the tax preparation application(s) (132) enables a tax preparation system (not shown) to send a request to the application interface(s) (118) of the donation management system (100) and to receive data from the application interface(s) (118) of the donation management system (100). More specifically, the tax preparation application(s) (132) may be configured to enable a tax preparation system (not shown) to request donation record(s) from the application interface(s) (118) of the donation management system (100) and to receive donation record(s) from the application interface(s) (118) of the donation management system (100). In this case, the tax preparation application(s) (132) may be configured to generate tax documentation based on the donation record(s). In addition, the tax preparation application(s) (132) may be configured to receive a request for historical tax information related to the user from the application interface(s) (118) of the donation management system (100). The tax preparation application(s) (132) are used by a tax preparation entity, which may include, but is not limited to, a donation application (e.g., ITSDEDUCTIBLE®, which is a registered service mark of Income Dynamics, Inc., of Omaha, Nebr., which is now owned by Intuit Inc. of Mountain View, Calif.), a certified public accountant, the user, a publication, a website, or some other tax preparation entity. In one or more embodiments of the invention, the tax preparation application(s) (132) is configured to be a data repository (150), described below.

Optionally, in one or more embodiments of the invention, the donation authority application(s) (136) is configured to receive a request from the application interface(s) (118) of the donation management system (100) and to send a response to the request to the application interface(s) (118) of the donation management system (100). More specifically, the donation authority application(s) (136) may be configured to receive a request from the application interface(s) (118) of the donation management system (100) to obtain a value for a donation, usually for a donated item. The donation authority application(s) (136) may also be configured to send the value of the donation to the donation management system (100) using the application interface(s) (118). The donation authority application(s) (136) are used by a donation authority entity, which may include, but is not limited to, a donation application (e.g., ITSDEDUCTIBLE®), a certified public accountant, the user, a publication, a website, or some other donation authority entity. In one or more embodiments of the invention, the donation authority application(s) (136) corresponds to a data repository (150), described below. In addition, the donation authority application(s) (136) may be configured to provide donation information to the tax preparation application(s) (132).

Those skilled in the art will appreciate that a donation authority application (136) may be included as a component of the donation management system (100). In this case, the donation management system (100) may directly utilize the donation authority application (136) to, for example, obtain a value for a donation.

Optionally, in one or more embodiments of the invention, the donation recipient application(s) (140) is configured to enable a donation recipient system (not shown) to send data to, and receive data from, the application interface(s) (118) of the donation management system (100). More specifically, the donation recipient application(s) (140) may be configured to send and/or obtain donation information to the application interface(s) (118) of the donation management system (100). In addition, the donation recipient application(s) (140) may be configured to receive donation information, or a request for donation information, from the application interface(s) (118) of the donation management system (100). For example, the donation recipient application(s) (140) may receive a request from the application interface(s) (118) of the donation management system (100) for donation information related to a cash donation made to a donation recipient through a website. In response to the request, the donation recipient application(s) (140) may then send the donation information to the application interface(s) (118) of the donation management system (100). A donation recipient application (140) may include, but is not limited to, a website, a person representing the donation recipient, or some other donation recipient application.

Optionally, in one or more embodiments of the invention, the calendar application(s) (144) is configured to interact with the donation management system (100). More specifically, the calendar application(s) (144) may be configured to send/receive information related to a donation appointment to/from the application interface(s) (118) of the donation management system (100). In addition, the calendar application(s) (144) may be configured to send/receive a donation reminder to/from the application interface(s) (118) of the donation management system (100). A calendar application(s) (144) may include, but is not limited to, time management software.

Optionally, in one or more embodiments of the invention, the global positioning application(s) (148) is configured to interact with a global positioning system (not shown) to send data to, and receive data from, the application interface(s) (118) of the donation management system (100). More specifically, the global positioning application(s) (148) may be configured to receive or request an address to a donation recipient from the application interface(s) (118) of the donation management system (100). Further, the global positioning application(s) (148) may be configured to send directions from a location to the donation recipient to the application interface(s) (118) of the donation management system (100). In this case, the directions provided by the global positioning application(s) (148) may include a map, total mileage, turn-by-turn directions, some other type of directions, or any suitable combination thereof. A global positioning application(s) (148) may include, but is not limited to, an in-dash navigation system for a car, a portable electronic navigation device, a web service, a local application executing on the user system (106), a smart phone, or a personal digital assistant.

In one or more embodiments of the invention, the donation management system (100) is configured to store reminder information. Reminders may contain information about a pending donation and may be sent to notify a donor in advance of the donation. In this case, the donation management system (100) is further configured to store reminder information in the data repository (150) using a reminder template to collect the reminder information. The reminder template is configured to include a number of fields to receive information about a scheduled donation. Examples of the fields of the reminder template include, but are not limited to, a description of the scheduled donation, the frequency of the reminder(s), and the date(s) of the reminder(s). The donation management system (100) may be configured to monitor the fields populated by the user in the reminder template, and, based on the information entered by the user into those fields in the reminder template, the donation management system (100) changes subsequent fields in the reminder template and also changes choices within a subsequent field in the reminder template. The reminder information received by the reminder template, through the donation management system (100), may come from sources including, but not limited to, a calendar application (144), user rule(s), a donation recipient application (140), other sources, or a combination thereof. Once the fields of the reminder template have been populated with information about a donation, the information in the reminder template may be stored as a reminder record in the data repository (150). Examples of the reminder template are described in more detail below in relation to FIGS. 7A-7C.

In one or more embodiments of the invention, the donation management system (100) is configured to retrieve and store donation information. More specifically, the donation management system (100) may be configured to use a data interface (114) to retrieve and store donation information in a data repository (150). Donation information contains details about a donation, such as donation recipient, donation value, and donation type. Donation information may also include or accompany a reminder of a pending donation. In this case, the data interface (114) is configured to store donation information in the data repository (150) using a donation template to collect the donation information. The donation template is configured to include a number of fields to receive information about a donation. Examples of the fields of the donation template include, but are not limited to, a description of the donation, the date of the donation, the type of donation, the address of the donation recipient, and the value of the donation. In one or more embodiments of the invention, the donation management system (100) is configured to monitor the fields populated by the user in the donation template, and, in response to the information entered by the user into those fields in the donation template, the donation management system (100) changes subsequent fields in the donation template and also changes choices within a subsequent field in the donation template. The donation information received by the donation template, through the donation management system (100), may come from sources including, but not limited to, a calendar application (144), user rule(s), a donation recipient application (140), a browser application (104), other sources, or a combination thereof. Once the fields of the donation template have been filled with information about a donation, the information may be stored as a donation record in the data repository (150). Examples of the donation template are described in more detail below in relation to FIGS. 6A-6B.

Figure 5A:
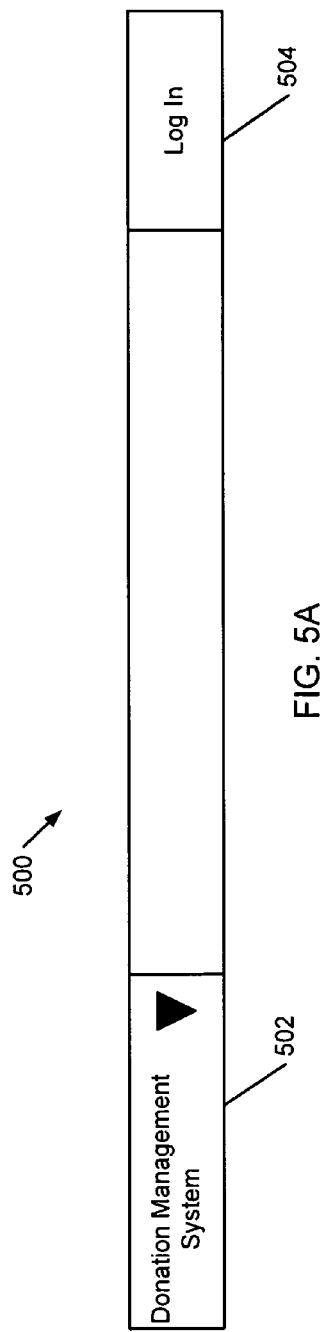
FIGS. 5A-5B show examples of a toolbar prior to logging into the system in accordance with one or more embodiments of the invention.
Figure 5B:
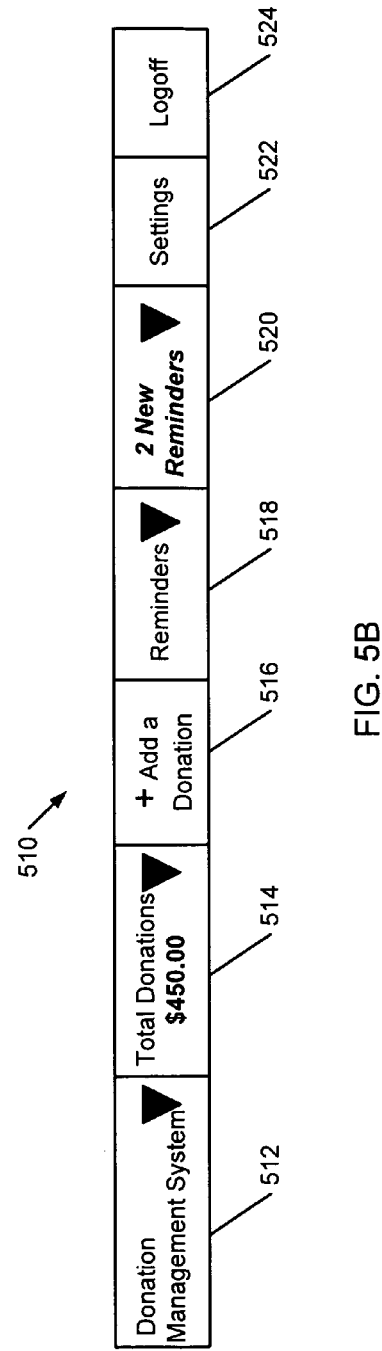

In one embodiment of the invention, the security module (122) is configured to secure interactions with the applications (e.g., the tax preparation application(s) (132), the donation authority application(s) (136), the donation recipient application(s) (140), the calendar application(s) (144), the global positioning application(s) (148) and/or the browser application (104)). More specifically, the security module (122) may be configured to authenticate communication from the applications based on security keys verifying the identity of the source of the communication. For example, a tax preparation application (132) may be associated with a security key enabling the tax preparation application (132) to interact with the application interface (118). Further, the security module (122) may be configured to restrict requests for donation information and access to donation information. For example, a browser application (104) associated with a user system (106) may be restricted to only receive requests for donation information initiated by a particular tax preparation entity. Conversely, a tax preparation application (132) associated with a tax preparation entity may be restricted to only access donation information associated with a particular user. FIGS. 5A-5B describe a toolbar before and after a user login to access the donation management system (100) according to one or more embodiments of the invention.

Those skilled in the art will appreciate that the browser application (104) may be configured to interact with the donation management system (100) using a browser extension. In this case, the browser extension may maintain an active session with the donation management system (100) after the security module (122) has authenticated the browser application (104). For example, the browser extension may continue to interact with the donation management system (100) as the user views various web content in the browser application (104). In this example, the browser extension may receive notifications from the donation management system (100) for presenting to the user.

In one embodiment of the invention, the donation module (124) is configured to analyze donation information. More specifically, the donation module (124) may be configured to receive a request from the donation management system (100) to track certain donation information. Further, the donation module (124) may be configured to monitor donation information with respect to a milestone. In this case, the donation module (124) may further be configured to notify the donation management system (100) when the donation information being tracked meets or exceeds the milestone. For example, the donation management system (100) may instruct the donation module (124) to track the value of the donations made in 2008 and to notify the donation management system (100) when the value of the donations made in 2008 exceeds $1,500.00. In this example, the donation management system (100) prompts the appropriate application interface (118) to send a notification to the proper application (e.g., browser application (104)).

In one embodiment of the invention, the data repository (150) is a persistent storage device (or set of devices) and is configured to store the donation record(s), the reminder record(s), and the user rule(s). Examples of a data repository (150) include, but are not limited to, a data base, a file system, a hard drive, some other form of data storage, or any suitable combination thereof.

In one embodiment of the invention, the data repository (150) is configured to store information about a donation, received from the donation template, as a donation record(s). A donation record may be created, stored, organized, retrieved, received, deleted and/or modified by the user using the browser application (104), a tax preparation entity using a tax preparation application (132), a donation authority using a donation authority application (136), a donation recipient using a donation recipient application (140), a calendar system using a calendar application (144), or a global positioning system using a global positioning application (148), where each of these applications communicates through the application interface(s) (118) of the donation management system (100). The security module (122) may limit access to the donation record(s). A donation record may be created for each donation managed by the donation management system (100).

In one embodiment of the invention, the data repository (150) is configured to store information about a donation reminder, received from the reminder template, as a reminder record. A reminder record may be created, stored, organized, retrieved, received, deleted and/or modified by the user using the browser application (104), a tax preparation entity using a tax preparation application (132), a donation authority using a donation authority application (136), a donation recipient using a donation recipient application (140), a calendar system using a calendar application (144), or a global positioning system using a global positioning application (148), where each of these applications communicates through the application interface(s) (118) of the donation management system (100). The security module (122) may limit access to the reminder record(s). A reminder record may be created for each donation managed by the donation management system (100), and a reminder record may generate one or more reminders for a donation.

In one or more embodiments of the invention, the donation management system (100) is configured to use the data interface (114) to store user rule(s) in the data repository (150). User rule(s) direct the donation management system (100) to follow certain predetermined guidelines, defined by the user, related to a donation. Examples of user rule(s) include, but not limited to, (i) specifying a default tax preparation entity to use, (ii) specifying a donation authority to use for a given donation or donation type, (iii) specifying which calendar system to send and/or receive a donation reminder, (iv) notifying the attendee prior to a scheduled donation, (v) specifying how often the password to login must be changed, (vi) specifying a global positioning system from which to receive directions to a donation recipient, and (vii) specifying notifications to be send based on analysis of the donation information. User rule(s) may have a hierarchy, where one user rule will trigger a second user rule. For example, a user rule to send a donation reminder may trigger a second user rule, such as the selection of a period of time prior to the scheduled donation that the donation reminder is sent. As another example, a user rule may be to present an option to delay a scheduled donation. In this example, if the user opts to delay the scheduled donation, the user may be prompted to declare how long to delay the scheduled donation. The security module (122) may be configured to limit access to the user rule(s).

Those skilled in the art will appreciate that the user rule(s) may be modified at any time by the user. In this case, each time the user rule(s) are modified, the data interface (114) may be configured to update the reminder record(s) and the donation record(s) in the data repository (150), as appropriate, to incorporate the revised user rule(s). For example, if the user modifies a user rule to be notified twenty four hours prior to a scheduled donation rather than one week, then the user receives a donation reminder at 9:00 a.m. on October 14 (as opposed to 9:00 a.m. on October 8), twenty four hours before a scheduled donation at 9:00 a.m. on October 15.

Those skilled in the art will appreciate that the aforementioned components may be located on a single system or distributed across multiple systems. Further, in embodiments in which the components are distributed across multiple systems, the distributed components may communicate over wired and/or wireless connections using well known communication protocols.

Figure 2A:
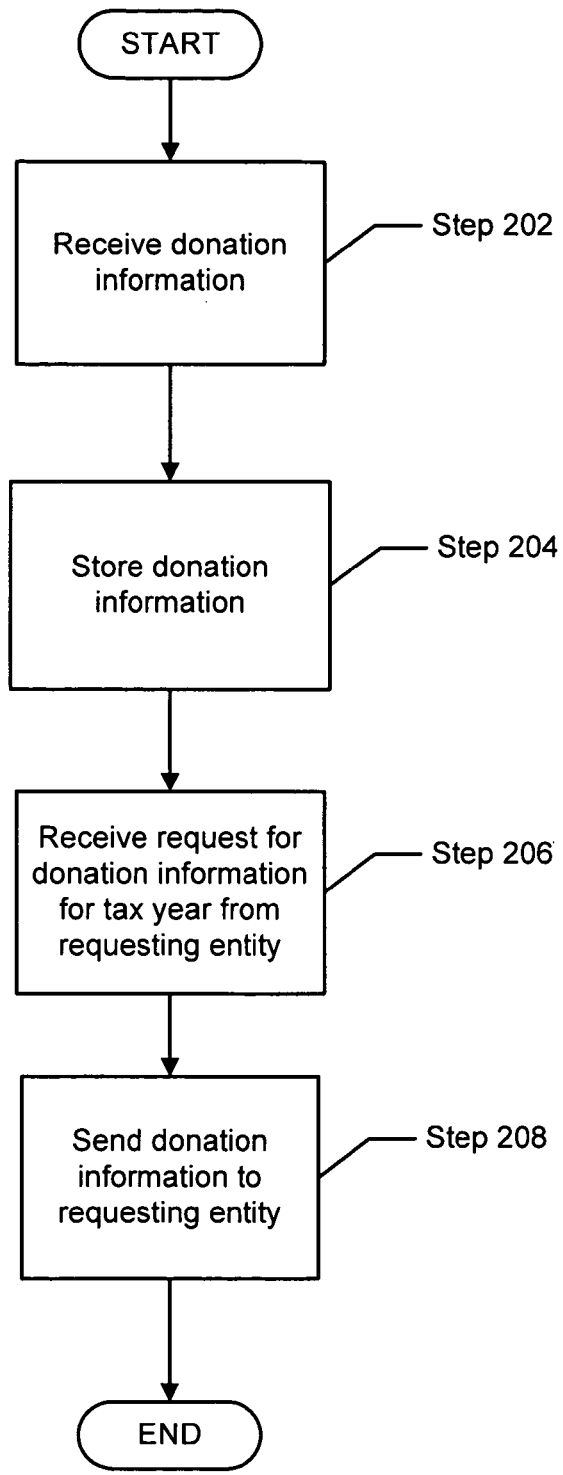
FIGS. 2A-2B show flowcharts for the method of managing charitable donations in accordance with one or more embodiments of the invention.
Figure 2B:
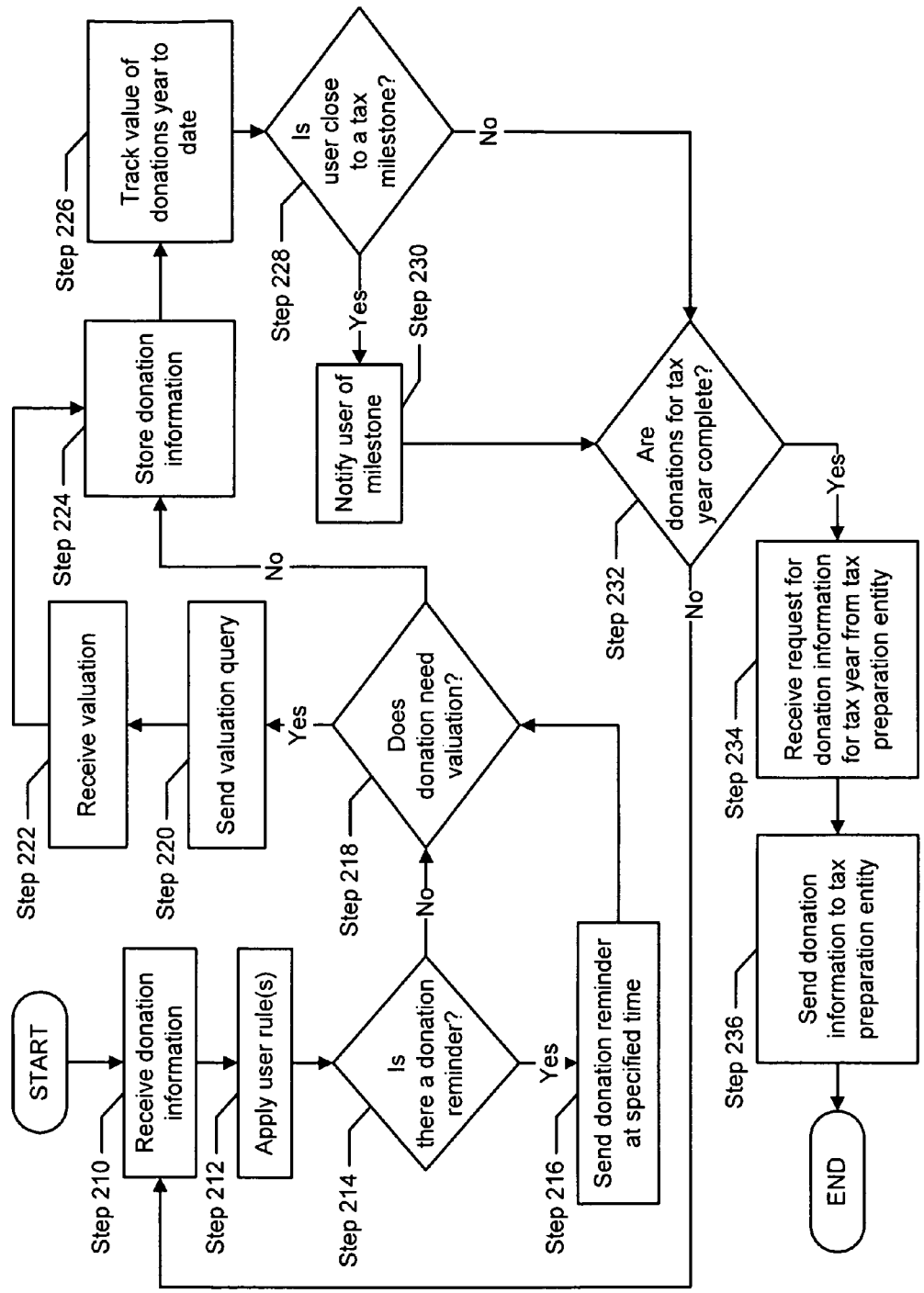

FIGS. 2A-2B show flow charts for managing charitable donations in accordance with one or more embodiments of the invention. One or more of the steps shown in FIGS. 2A-2B may be omitted, repeated, and/or performed in a different order than that shown in FIGS. 2A-2B. In addition, a person of ordinary skill in the art will appreciate that other steps, omitted in FIGS. 2A-2B, may be included in one or more of these flowcharts. Accordingly, the specific arrangement of steps shown in FIGS. 2A-2B should not be construed as limiting the scope of the invention.

FIG. 2A shows a flow chart for capturing a donation information for a donation. In Step 202, information about a donation is received. More specifically, in one or more embodiments of the invention, donation information is received from a browser application, as discussed with respect to FIG. 1. The donation information may include, but is not limited to, the type of donation, the date of the donation, the address of the donation recipient, and the value of the donation. In one or more embodiments of the invention, the donation information may also include a recorded image of the donated item and/or a recorded image of the receipt of the donated item. More detail regarding receiving donation information is described with respect to FIG. 3, and examples of receiving donation information are described with respect to FIGS. 6A-6B.

Those skilled in the art will appreciate that the donation information may be obtained by the browser application independent of the web content presented by the browser application. For example, the browser application may utilize a browser extension to obtain the donation information while presenting web content unrelated to managing donations. In other embodiments, the browser application may obtain donation information from presented web content in order to facilitate collection of the donation information. For example, the browser application may extract information from web content while the user (i.e., donor) is donating using a web site associated with a donation recipient. In this case, the browser extension may automatically receive the donation information from the browser application for validation by the user (i.e., donor).

In Step 204, the donation information is stored. The donation information may be stored as a donation record. More specifically, the donation information may be stored as described above with respect to FIG. 1. In Step 206, a request is received for the donation information. More specifically, the donation information may be requested by an entity with authority to do so, such as the user (i.e., donor) and a tax preparation entity. The request may vary depending on the requirements of the user (i.e., donor). For example, the request may be for tax records that pertain to a period of time, for tax records of a certain type (e.g., donation of items), or for tax records that pertain to some other criteria specified by the requesting entity. In another example, the request for donation information may be received from a web site used to collect donations, such as www.goodwill.org. In Step 208, the donation information that was requested is sent to the entity that requested them.

FIG. 2B shows a flow chart for capturing donation information for a tax year. In Step 210, information associated with a donation is obtained. In one or more embodiments of the invention, the information may be obtained as described with respect to Step 202 of FIG. 2A. In Step 212, one or more user rules are applied. User rules may be set or modified by the user at any time, or they may be set by default. User rules may include, but are not limited to, specific donation information (e.g., value and/or frequency of a donation), tax year for which the donation applies, and tax milestones.

In Step 214, a determination is made as to whether a donation reminder is associated with the donation. If a donation reminder is associated with the donation, then the process proceeds to Step 216. In Step 216, the donation reminder for the donation is sent at the specified time. An example of a donation reminder is described below with respect to FIG. 8B.

If a donation reminder is not associated with the donation, then the process proceeds to Step 218. In Step 218, a determination is made as to whether the donation requires a valuation. If the donation requires a valuation, then the process proceeds to Step 220. In Step 220, a query is sent to determine a value of the donation. The donation may be valued by a number of sources, including but not limited to the user, a reference, a donation authority application, or a third party. In Step 222, the valuation of the donation is received.

If the donation does not need a valuation, then the process proceeds to Step 224. In Step 224, the donation information is stored. In Step 226, the value of the donations made for the tax year is tracked. The user may, by altering the user rules, track donations for some other period of time. In Step 228, a determination is made as to whether the user is approaching a tax milestone. If the user is approaching a tax milestone, then the process proceeds to Step 230. In Step 230, the user is notified of the pending milestone. An example of a milestone notification is described with respect to FIG. 8A.

If the user is not approaching a tax milestone, then the process proceeds to Step 232. In Step 232, a determination is made as to whether the donations for the tax year are complete. If the donations for the tax year are complete, then the process proceeds to Step 234. In Step 234, a request for the donation information for the tax year is received from a tax preparation entity. In Step 236, the donation information is sent to the tax preparation entity. If the donations for the tax year are not complete, then the process proceeds to Step 210.

Figure 3:
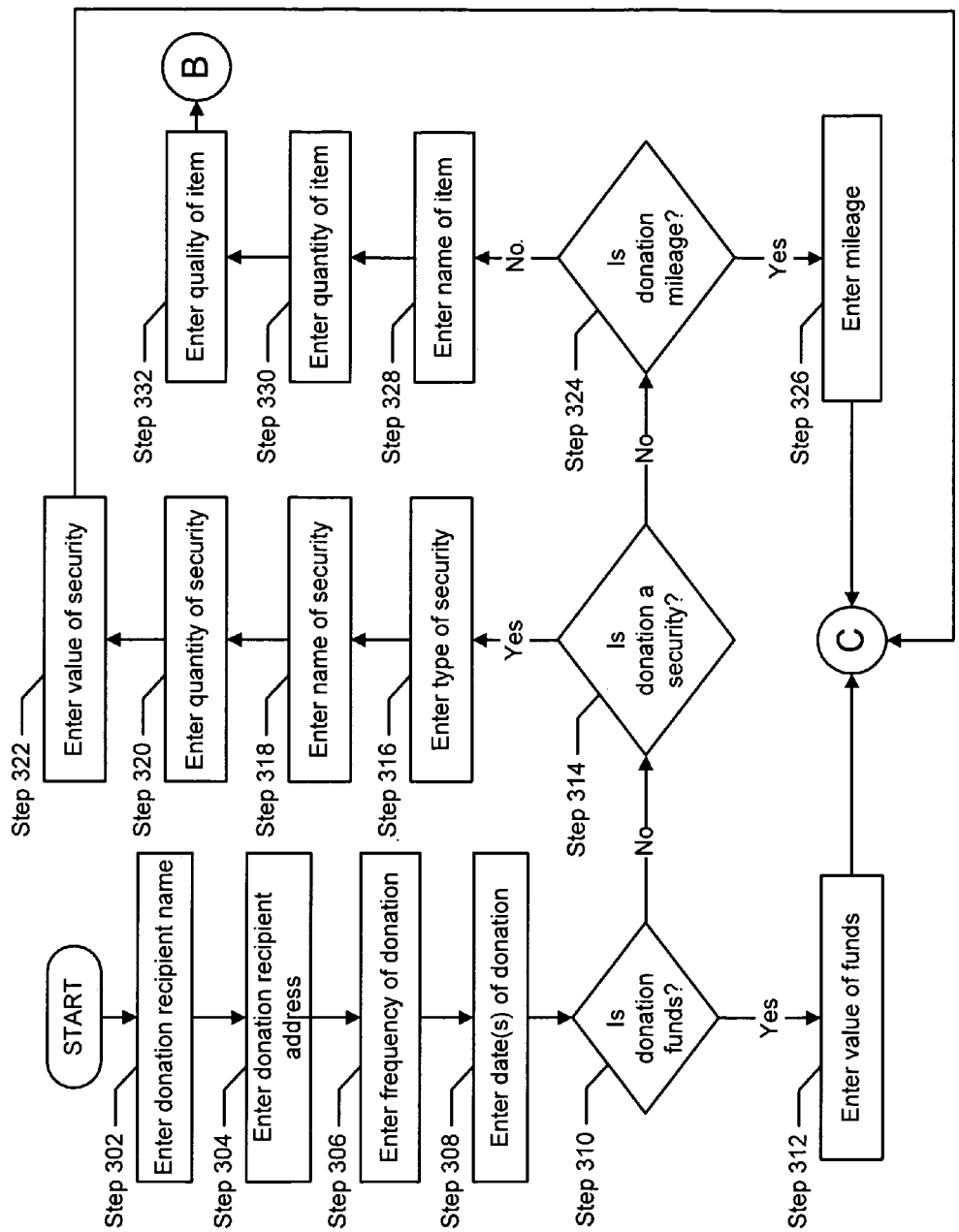
FIG. 3 shows a flowchart for creating a donation record in accordance with one or more embodiments of the invention.
Figure 3:
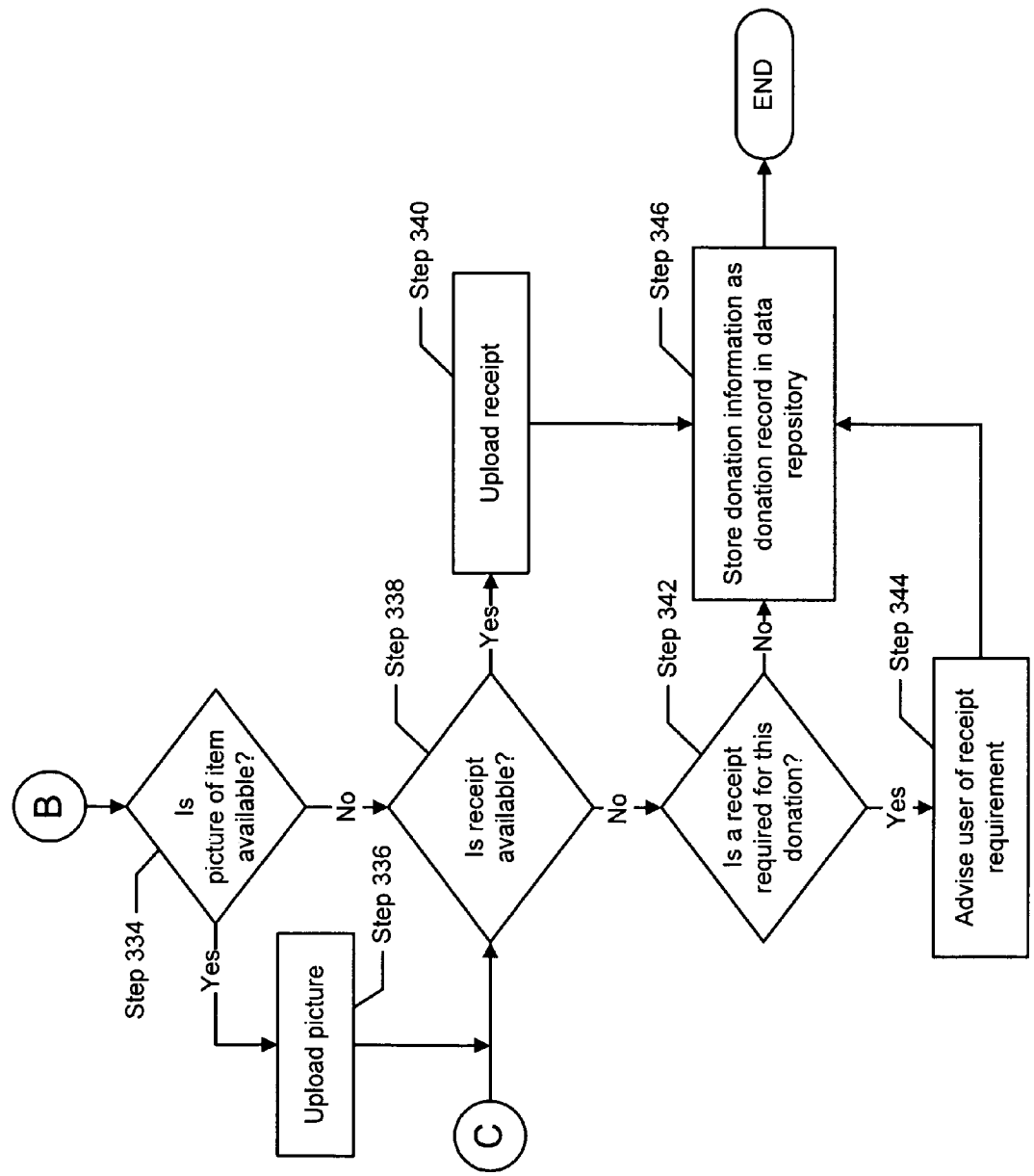

FIG. 3 shows a flow chart for creating and saving a donation record in accordance with one or more embodiments of the invention. One or more of the steps shown in FIG. 3 may be omitted, repeated, and/or performed in a different order than that shown in FIG. 3. In addition, a person of ordinary skill in the art will appreciate that other steps, omitted in FIG. 3, may be included in one or more of these flowcharts. Accordingly, the specific arrangement of steps shown in FIG. 3 should not be construed as limiting the scope of the invention. Examples of donation templates, used to create donation records in one or more embodiments of the invention, are described with respect to FIGS. 6A-6B.

In Step 302, the name of the donation recipient receiving the donation is entered. The name of the donation recipient receiving the donation may be entered in a number of ways, including but not limited to free form entry, selection from a drop-down list, and selection from a series of radio buttons. In Step 304, the address of the donation recipient receiving the donation is entered. In one or more embodiments of the invention, the address includes a number of fields used to enter various parts of the address of the donation recipient. For example, the fields may include, but are not limited to, a field for the street number of the donation recipient; a field for the street name of the donation recipient; a field for the city of the donation recipient; a field for the state of the donation recipient; and a field for the zip code of the donation recipient. In one or more embodiments of the invention, only the city and state of the donation recipient are required address fields, and the remaining address fields are optional. In one or more embodiments of the invention, the address fields are automatically populated based on the name of the donation recipient receiving the donation.

In Step 306, the frequency of the donation to the donation recipient is entered. Examples of the frequency may include, but are not limited to, a number or an occurrence per period of time (e.g., once per quarter, monthly). In Step 308, the date of the donation is entered. The date of the donation may be chosen from a calendar, entered in free form, selected from a single or series of drop-down lists, or any other way of selecting a date. If the donation occurs more than once, than multiple dates or other forms of frequency may be entered. Examples of other forms of frequencies that may be entered include, but are not limited to, "the $10^{th}$ of every month," "the first day of every quarter," and "the third Wednesday of the month."

In Step 310, a determination is made as to whether the donation is funds. If the donation is funds, then the process proceeds to Step 312. In Step 312, the value of the donated funds is entered, and then the process proceeds to Step 338.

If the donation is not funds, then the process proceeds to Step 314. In Step 314, a determination is made as to whether the donation is a security. If the donation is a security, then the process proceeds to Step 316. If the donation is not a security, then the process proceeds to Step 324. In Step 316, the type of security is entered. The type of security may be entered in a number of ways, including but not limited to free form entry, selection from a drop-down list, and selection from a series of radio buttons. Types of securities may include, but are not limited to, shares of stock, shares of a fund, a bond, and a certificate of deposit. In Step 318, the name of the security is entered. In Step 320, the quantity of the security is entered. In Step 322, the value of the security is entered, and then the process proceeds to Step 338.

In Step 324, a determination is made as to whether the donation is mileage. If the donation is mileage, then the process proceeds to Step 326. If the donation is not mileage, then the donation is an item, and the process proceeds to Step 328. In Step 326, the mileage is entered.

In Step 328, the name of the item donated is entered. The name of the donation may be entered in a number of ways, including but not limited to free form entry, selection from a drop-down list, and selection from a series of radio buttons. Examples of a name for a donated item include, but are not limited to, car, men's dress shoes, chest of drawers, and picture frame. In Step 330, the quantity of the item is entered. The quantity of the item may be entered in a number of ways, including but not limited to free form entry, selection from a drop-down list, and selection from a series of radio buttons. In Step 332, the quality of the item is entered. The quality of the item may be entered in a number of ways, including but not limited to free form entry, selection from a drop-down list, and selection from a series of radio buttons. Examples of the quality of an item include, but are not limited to, excellent, fair, poor, and good.

In Step 334, a determination is made as to whether a picture of the donated item is available. If a picture of the donated item is available, then the process proceeds to Step 336. If a picture of the donated item is not available, then the process proceeds to Step 338. In Step 336, the picture of the donated item is uploaded.

In Step 338, a determination is made as to whether a receipt for the donated item is available. If a receipt for the donated item is available, then the process proceeds to Step 340. If a receipt for the donated item is not available, then the process proceeds to Step 342. In Step 340, the receipt for the donated item is uploaded, and the process proceeds to Step 346.

In Step 342, a determination is made as to whether a receipt for the donated item is required. In one or embodiments of the invention, the applicable tax law requires receipts for certain donated items. If a receipt for the donated item is required, then the process proceeds to Step 344. If a receipt for the donated item is not required, then the process proceeds to Step 346. In Step 346, the donation information is stored as a donation record in a data repository.

Figure 4:
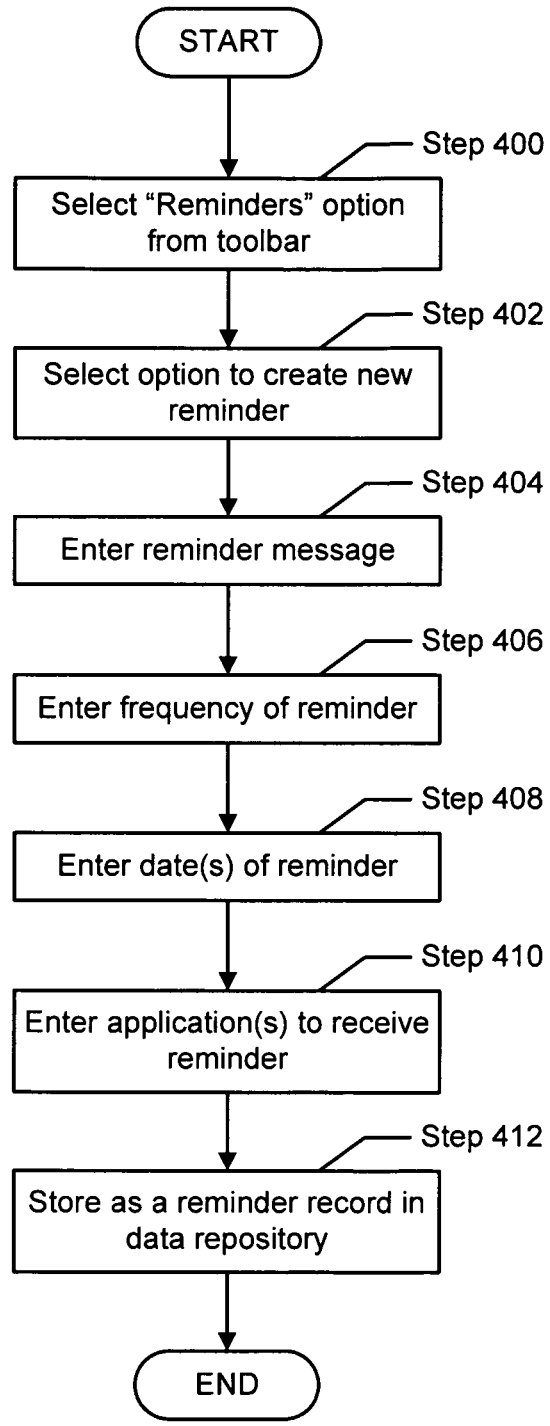
FIG. 4 shows a flowchart for creating a donation reminder in accordance with one or more embodiments of the invention.

FIG. 4 shows a flow chart for creating and saving a reminder record in accordance with one or more embodiments of the invention. In one or more embodiments of the invention, one or more of the steps shown in FIG. 4 may be omitted, repeated, and/or performed in a different order than that shown in FIG. 4. In addition, a person of ordinary skill in the art will appreciate that other steps, omitted in FIG. 4, may be included in one or more of these flowcharts. Accordingly, the specific arrangement of steps shown in FIG. 4 should not be construed as limiting the scope of the invention.

In Step 400, the "Reminder" option from a toolbar of a browser application is selected. Examples of the toolbar are described below in FIGS. 5A-5B. In one embodiment of the invention, a new menu or submenu may appear after the "Reminder" option is selected, providing more options related to reminders. In Step 402, an option to create a new reminder is selected. In one embodiment of the invention, a reminder template may appear after this selection is made. Examples of a reminder template are described below in FIGS. 7A-7C.

In Step 404, a reminder message is entered. In one embodiment of the invention, the reminder message may be a free-form entry field. In Step 406, the frequency of the reminder is entered. In Step 408, the date of each reminder is entered. In one embodiment of the invention, if the frequency of the reminder in Step 406 is once, then a specific date may be entered. In another embodiment of the invention, if the frequency of the reminder in Step 406 is more than once, then a number of different choices may be presented as options. For example, if the frequency of the reminder is every month, then a day of each month may be chosen.

Optionally, in Step 410, one or more applications may be chosen to receive the reminder. An application may be determined by manual selection or by user rule(s). An application may include, but is not limited to, a browser application, a calendar application, some other application, or any combination thereof. In Step 412, the information from the reminder template is stored as a reminder record in a data repository.

The following FIGS. 5A-5B, 6A-6C, 7A-7B, and 8A-8B show examples in accordance with one or more embodiments of the invention. The following description of FIGS. 5A-5B, 6A-6C, 7A-7B, and 8A-8B incorporates the references from FIG. 1. The examples are not intended to limit the scope of the invention.

Referring to FIG. 5A, FIG. 5A shows an example of a browser extension in the form of a toolbar prior to user login (500) in accordance with one or more embodiments of the invention. In one or more embodiments of the invention, the toolbar prior to user login (500) may include a donation management system (502) field and a login (504) field.

Continuing with the example shown in FIG. 5A, the donation management system (502) field is configured to display links to information and/or websites related to the invention, in accordance with one or more embodiments of the invention. Examples of such links in the donation management system (502) include, but are not limited to, a help menu, an information menu, a link to ITSDEDUCTIBLE® or some other donation authority, and relevant contact information. The links in the donation management system (502) field may appear in a list in a drop-down menu, as in this example, or in some other format.

In one or more embodiments of the invention, the login (504) field is configured to receive an identification and password from the user. In one or more embodiments of the invention, if the identification and password are given correctly, in combination, then the user may be given access to his account in the donation management system (100 of FIG. 1). In one or more embodiments of the invention, the identification and password may be case sensitive, and the use of letters, numbers, symbols, other character types, or any combination thereof may be required to recognize the identification and password. In addition, in one or more embodiments of the invention, there may be a requirement for the user to change the password on a periodic basis.

In one or more embodiments of the invention, the login (504) field may enable the user to declare that he has forgotten his identification and/or password. The login (504) field may also enable the user to request that his identification and/or password be remembered in the future. In one or more embodiments of the invention, if the user does not have an account, then, after selecting the login (504) field, the user may be given an option to create a new account.

Referring to FIG. 5B, FIG. 5B shows an example of a browser extension in the form of a toolbar after user login (510) in accordance with one or more embodiments of the invention. The toolbar prior to user login (510) includes: (i) a donation management system (512) field; (ii) a donation tracking (514) field; (iii) a donation addition (516) field; (iv) a reminder (518) field; (v) a new reminder (520) field; a (vi) settings (522) field; and (vii) a logout (524) field. The configuration of and description for the donation management system (512) in FIG. 5B may be as described with respect to FIG. 5A above.

In one or more embodiments of the invention, the donation tracking (514) field is configured to display the total value of donations on the toolbar after user login (510). In one or more embodiments of the invention, the donation tracking (514) field may also have a drop-down menu or some other means of producing a menu. In one or more embodiments of the invention, the menu of the donation tracking (514) field may contain an option to list all donations, view specific a donation, search for a donation, display some other option, or any combination thereof. In one or more embodiments of the invention, the donation addition (516) field may be configured to enable the user to add a donation. The process for adding a donation is described in more detail with respect FIG. 3 above.

In one or more embodiments of the invention, the reminder (518) field is configured to enable the user to look at all of the reminders that are scheduled to be sent on a future date. In one embodiment of the invention, the full reminder for each scheduled donation may be displayed in the reminder (518) field, or the reminder (518) field may have a link for each scheduled donation, which the user may select to retrieve details of that scheduled donation. In one embodiment of the invention, the reminder (518) field may also enable the user to edit and/or cancel a reminder. In one or more embodiments of the invention, the reminder (518) field may also enable the user to select where the reminder should be sent. For example, the user may choose to have a reminder sent to his personal email address, his mobile phone, his calendar application, some other location, or any combination thereof.

In one or more embodiments of the invention, the new reminder (520) field is configured to enable the user to view a current reminder for a scheduled donation. In one embodiment of the invention, the new reminder (520) field may enable the user to enter the donation as having been made. The new reminder (520) field may also enable the user to renew the reminder on a later date or to cancel the reminder. The new reminder (520) field may also enable the user to access the donation authority for more information about the scheduled donation, such as the value of the scheduled donation.

In one or more embodiments of the invention, the settings (522) field is configured to enable the user to create, adjust, or delete settings for the toolbar after user login (510). In one or more embodiments of the invention, the settings for the toolbar may also be created, adjusted, or deleted by the user rule(s), other aspects of the invention, or any combination thereof. In one or more embodiments of the invention, the logoff (524) field may be configured to enable the user to logoff of his account.

Referring to FIG. 6A, FIG. 6A shows an example of a donation template (600) for an item in accordance with one or more embodiments of the invention. The donation template (600) includes the following: (i) a name of the donation recipient field (602); (ii) a country of donation recipient field (603); (iii) a street address of the donation recipient field (604); (iv) a city of donation recipient field (606); (v) a state of donation recipient field (608); (vi) a zip code of donation recipient field (610); (vii) an inquiry of single donation field (612); (viii) a date of donation field (614); (ix) a type of donation field (616); (x) a description of item field (618); (xi) a detailed description of the item field (620); (xii) a quantity of item field (622); (xiii) a condition of item field (624); (xiv) a value of item field (626); (xv) a picture of item heading (628); (xvi) an upload picture option (630); (xvii) a picture file label field (632); (xviii) a copy of receipt heading (634); (xix) an upload receipt option (636); (xx) a receipt file label field (638); and (xxi) a series of response options, which includes (i) a save donation option (640); (ii) a clear template option (642); and (iii) a cancel option (644). Information for each of the fields in this example may be entered in a number of ways, including but not limited to free form entry, selection from a drop-down list, and selection from a series of radio buttons.

The name of donation recipient field (602) is configured to store the name of the donation recipient to which the donation is made. In this example, the donation recipient is the Red Diamond. The country of donation recipient field (603) is configured to store the country of the donation recipient to which the donation is made. In this example, the country is the United States. The street address of donation recipient field (604) is configured to store the street address of the donation recipient to which the donation is made. In this example, the street address is 1234 Main Street. The state of donation recipient field (606) is configured to store the state, province, territory, or other division of land in a country of the donation recipient to which the donation is made. In one or more embodiments of the invention, the state, province, territory, or other division of land in a country is for the United States or for any other country. In this example, the state is Montana. The city of donation recipient field (608) is configured to store the city of the donation recipient to which the donation is made. In addition, the choices in the city of donation recipient field (608) may be based on the response of the user in the state of donation recipient field (606), allowing only cities that exist in that state, province, territory, or other division of land to appear as selection options for the user. The zip code of donation recipient field (610) is configured to store the zip code of the donation recipient to which the donation is made. In this example, the zip code is 99999.

The single donation inquiry (612) is configured to determine whether the donation is a single donation and store the determination. In this example, the donation is a single donation (e.g., a one-time donation). The date of donation (614) field is configured to store the date that the donation is made. In this example, the date that the donation is made is Jul. 29, 2008. The type of donation field (616) is configured to store the type of donation. In this example, the type of donation is an item. The description of the item field (618) is configured to store the description of the item. The description of the item field (618) is for the description of an item in this example because the type of donation is selected as an item. FIG. 6B shows an example of how subsequent fields are labeled based on the selection for the type of donation. In this example, the description of the item is a car.

The detailed description of item field (620) is configured to store a detailed description of the item. In this example, the detailed description of the item is a 1992 Honda Civic EX Sedan. The quantity of item field (622) is configured to store the quantity of the donated item. In this example, the quantity is one. The condition of item field (624) is configured to store the condition of the item. In this example, the condition of the item is good. In one or more embodiments of the invention, checkboxes, radio buttons, or similar selection devices may be used to select the condition of item. Those skilled in the art will appreciate that other conditions (e.g., excellent) may be used to describe the condition of the item. The value of item field (626) is configured to store the value of the donated item. In this example, the value of the car is $1,300.00.

The picture of item heading (628) is configured to designate the area within the donation template (600) where a picture of the donated item may be uploaded using an upload picture option (630). In this example, the upload picture option (630) is a pushbutton. If a picture has been uploaded, the upload picture option (630) is inactive (as shown), and the name of the file is placed in the picture file label field (632). In this example, the file name is "donated car" that is a .jpg type file with a size of 125 kb.

The copy of receipt heading (634) is configured to designate the area within the donation template (600) where a receipt for the donated item may be uploaded using an upload receipt option (636). In this example, the upload receipt option (636) is a pushbutton. If a receipt has been uploaded, the name of the file is placed in the receipt file label field (638). In this example, a file for the receipt has not been uploaded.

The series of response options (640, 642, 644) is configured to allow the user to choose how to proceed from the donation template (600) and stores the choice of the user. This series of response options may be presented to the user in a variety of forms. In this case, the series of response options are in the form of pushbuttons, and they include a save donation option (640), a clear template option (642), and a cancel option (644). If the save donation option (640) is selected, the information in the fields of the donation template (600) are extracted and a donation record is created. If the clear template option (642) is selected, the fields in the donation template (600) clear. If the cancel option (644) is selected, the donation template (600) closes without saving any information.

Referring to FIG. 6B, FIG. 6B shows an example of a donation template (650) for an item in accordance with one or more embodiments of the invention. The donation template (650) includes the following: (i) a name of the donation recipient field (652); (ii) a country of donation recipient field (653); (iii) a street address of the donation recipient field (654); (iv) a city of donation recipient field (656); (v) a state of donation recipient field (658); (vi) a zip code of donation recipient field (660); (vii) an inquiry of single donation field (662); (viii) a date of donation field (664); (ix) a type of donation field (666); (x) a description of funds field (668); (xi) a check number field (670); (xii) a value of donation field (672); (xiii) a copy of cancelled check field (676); (xiv) an upload picture option (678); (xv) a picture file label field (680); (xvi) a copy of receipt heading (682); (xvii) an upload receipt option (684); (xviii) a receipt file label field (686); and (xix) a series of response options, which includes (i) a save donation option (688); (ii) a clear template option (690); and (iii) a cancel option (692). Information for each of the fields in this example may be entered in a number of ways, including but not limited to free form entry, selection from a drop-down list, and selection from a series of radio buttons.

The configuration of and description for the name of the donation recipient field (652), the country of donation recipient field (653), the street address of the donation recipient field (654), the city of donation recipient field (656), the state of donation recipient field (658), the zip code of donation recipient field (660), the inquiry of single donation field (662), the date of donation field (664), the type of donation field (666), the upload picture option (678), the picture file label field (680), the copy of receipt heading (682), the upload receipt option (684), the receipt file label field (686), and the series of response options (i.e., the save donation option (688), the clear template option (690), and the cancel option (692)) in this FIG. 6B are substantially similar to the description for the corresponding components described with respect FIG. 6A above.

The description of funds field (668) is similar to the description of item field (618) in FIG. 6A. The difference is that the heading of the description of funds field (668) describes funds because "funds" is entered as the type of donation (666) in the previous field of the donation template (650). Consequently, some of the fields subsequent to the type of donation field (616) in FIG. 6A do not have corresponding fields in FIG. 6B (e.g., FIG. 6A has a detailed description of item field (620), where FIG. 6B has no such field for funds). In addition, some of the fields in FIG. 6A are labeled differently than the corresponding fields in FIG. 6B (e.g., FIG. 6A has a picture of item heading (628), where the corresponding heading in FIG. 6B is the copy of cancelled check heading (676)). In this example, the description of the funds is a personal check.

The configuration of and description for the check number field (670) is substantially similar to that of the detailed description of item field (620) in FIG. 6A. The configuration of and description for the value of donation field (672) is substantially similar to that of the value of item field (626) of FIG. 6A.

Figure 7A:
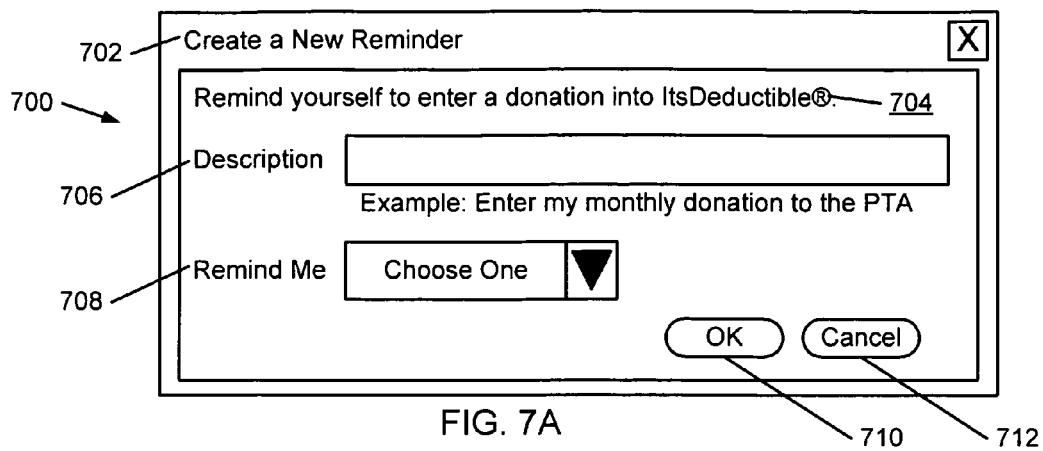
FIGS. 7A-7C show examples of a template to create a new donation reminder in accordance with one or more embodiments of the invention.

Referring to FIG. 7A, FIG. 7A shows an example of a reminder template (700) in accordance with one or more embodiments of the invention. The reminder template (700) includes: (i) a heading (702); (ii) a purpose statement (704); (iii) a description (706) field; (iv) a primary frequency (708) field; (v) an acknowledgment (710); and (vi) a cancellation option (712).

In one or more embodiments of the invention, the heading (702) is configured to state the general purpose of the reminder template (700). In this example, the heading (702) states, "Create a New Reminder." In one or more embodiments of the invention, the purpose statement (704) may be configured to state the specific purpose of the reminder template (700). In one or more embodiments of the invention, the purpose statement (704) may utilize information contained in the user rules, the settings (522 of FIG. 5B), from some other source, or any combination thereof. In this example, the heading (702) states, "Remind yourself to enter a donation into ITSDEDUCTIBLE®." ITSDEDUCTIBLE® may have been the default donation authority, or ITSDEDUCTIBLE® may have been chosen by the user to be the donation authority in the user rules, the settings (522 of FIG. 5B), or some other source. In one or more embodiments of the invention, the description (706) field is configured to store the reminder associated with a donation. In one or more embodiments of the invention, the description (706) field may be a free-form entry, as in this example, a list of selections in a drop-down menu, some other format, or any combination thereof.

In one or more embodiments of the invention, the primary frequency (708) field may be configured to store the first portion of the determination of the frequency of the reminder. In one or more embodiments of the invention, the primary frequency (708) field may be one chosen from a list in a drop-down menu, as in this example, from a series of radio button options, from some other method, or any combination thereof. Examples of an entry for the primary frequency (708) field may include, but are not limited to, only once, every week, every month, every quarter, and every year. In one or more embodiments of the invention, as a choice is made for the primary frequency (708) field, a secondary frequency field may appear on the template. The secondary frequency field is not shown in this example, but it is shown and described with respect to FIGS. 7B and 7C.

In one or more embodiments of the invention, the acknowledgment (710) enables the information in the reminder template (700) to be stored as a reminder record. In this example, the acknowledgment (710) is in the form of a pushbutton that says, "OK." In one or more embodiments of the invention, the cancellation option (712) enables the user to prevent a reminder record from being created. In this case, the cancellation option (712) is both a pushbutton, located at the lower right portion of the reminder template (700), and a "close window" button, located in the upper right corner of the reminder template (700).

Figure 7B:
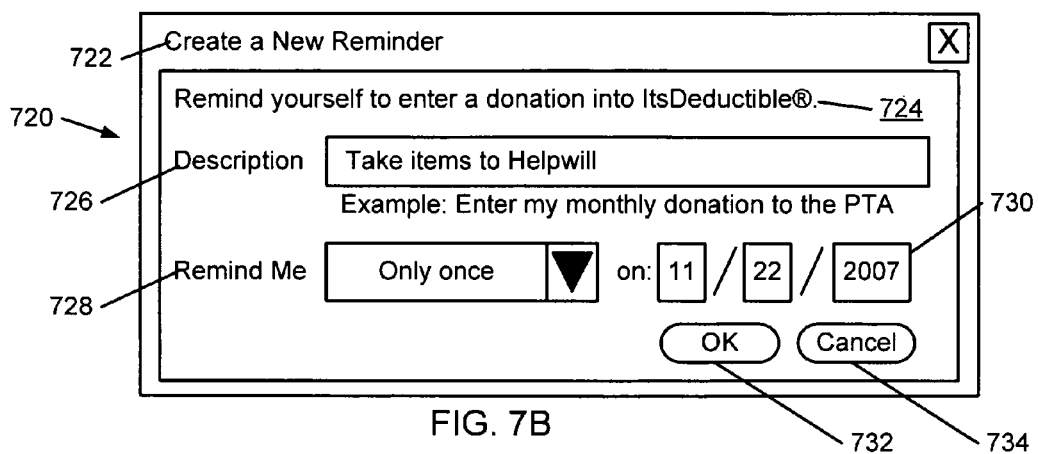

Referring to FIG. 7B, FIG. 7B shows an example of a reminder template (720) in accordance with one or more embodiments of the invention. The reminder template (720) includes: (i) a heading (722); (ii) a purpose statement (724) field; (iii) a description (726) field; (iv) a primary frequency (728) field; (v) a secondary frequency (730) field; (vi) an acknowledgment (732); and (vii) a cancellation option (734).

The configuration of and description for the heading (722), the purpose statement (724), the description (726) field, the primary frequency (728) field, the acknowledgment (732), and the cancellation option (734) in this FIG. 7B are substantially similar to the description for the corresponding components described with respect to FIG. 7A above.

The secondary frequency (730) field is configured to store the second portion of the determination of the frequency of the reminder. The appearance of the secondary frequency (730) field may be at any location in the reminder template (720). In this case, the secondary frequency (730) field appears in the space to the right of the primary frequency (728) field in the reminder template (720). The information to be stored in the secondary frequency (730) field is based on the information stored in the primary frequency (728) field. In this example, the primary frequency (728) field stores "only once" based on the choice made by the user from the drop down menu. Consequently, in one or more embodiments of the invention, the user may enter a single date, by month, by day, by year, or by some other increment of time into the secondary frequency (730) field. In this example, the single date that the reminder is scheduled to be sent is Nov. 22, 2007.

Figure 7C:
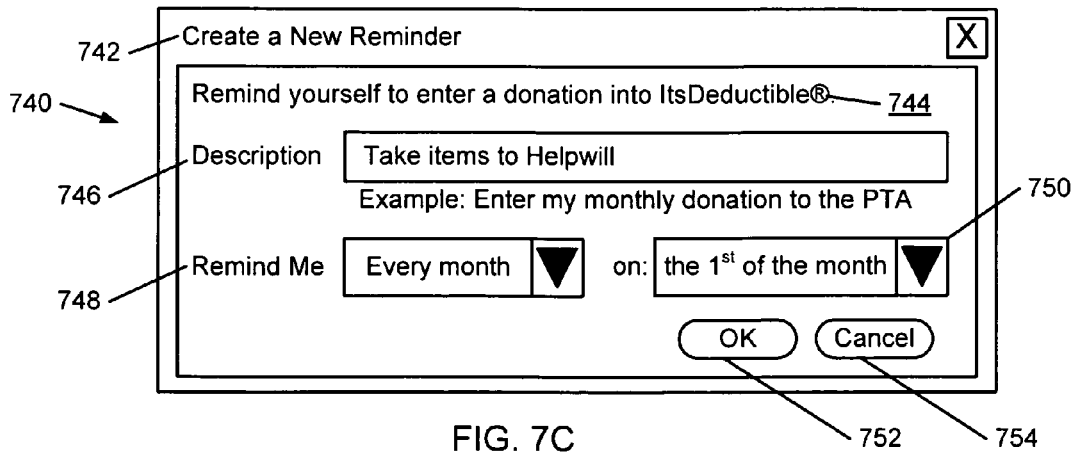

Referring to FIG. 7C, FIG. 7C shows an example of a reminder template (740) in accordance with one or more embodiments of the invention. The reminder template (740) includes: (i) a heading (742); (ii) a purpose statement (744); (iii) a description (746) field; (iv) a primary frequency (748) field; (v) a secondary frequency (750) field; (vi) an acknowledgment (752); and (vii) a cancellation option (754).

The configuration of and description for the heading (742), the purpose statement (744), the description (746) field, the primary frequency (748) field, the acknowledgment (752), and the cancellation option (754) in this FIG. 7C are substantially similar to the description for the corresponding components described with respect to FIG. 7A above.

As described above for FIG. 7B, in one or more embodiments of the invention, the secondary frequency (750) field in FIG. 7C may be configured to store the second portion of the determination of the frequency of the reminder. In one or more embodiments of the invention, the appearance of the secondary frequency (750) field may be at any location in the reminder template (740). In this case, the secondary frequency (750) field appears in the space to the right of the primary frequency (748) field in the reminder template (740). In one or more embodiments of the invention, the information to be stored in the secondary frequency (750) field may be based on the information stored in the primary frequency (748) field. In this example, the primary frequency (748) field stores "every month" based on the choice made by the user from the drop down menu. Consequently, in one or more embodiments of the invention, the secondary frequency (750) field may be configured as a drop down menu. Choices for this drop down menu in the secondary frequency (750) field may include, but are not limited to, a day of the month, an occurrence of a day of the week in the month, some other monthly description, or any combination thereof. In this example, the reminder is scheduled to be sent on the first day of every month.

Figure 8A:
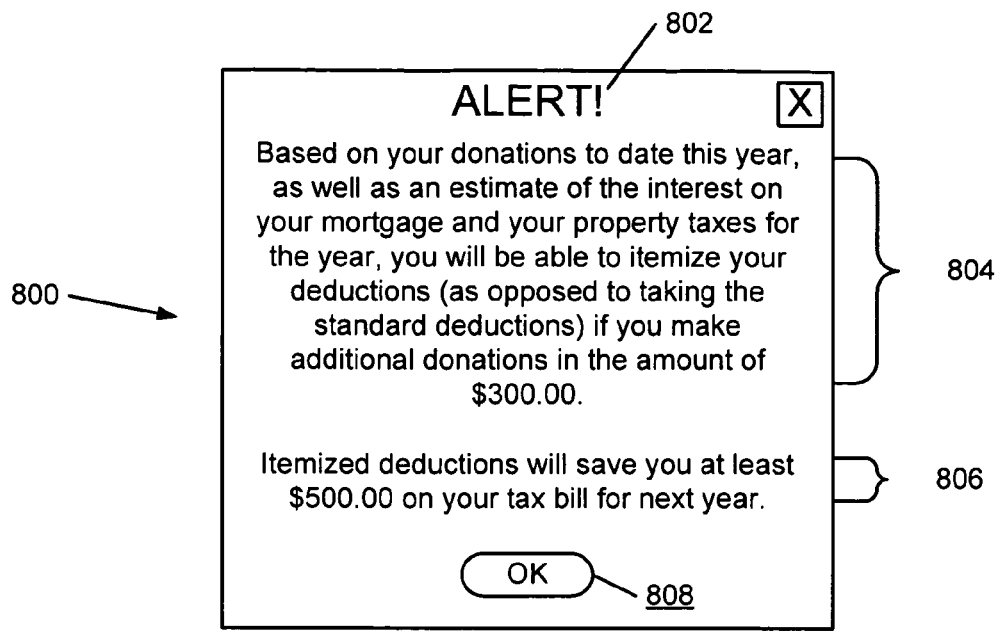
FIGS. 8A-8B show examples of an alert notification in accordance with one or more embodiments of the invention.

Referring to FIG. 8A, FIG. 8A shows an example of an alert notification (800) in accordance with one or more embodiments of the invention. The alert notification (800) may include: (i) an alert exclamation (802); (ii) an alert message (804); (iii) an information statement (806); and (iv) an acknowledgement (808). This example is for explanatory purposes only and is not intended to limit the scope of the invention. In one or more embodiments of the invention, other messages may be shown, both for the circumstance of this example as well as for other events. In addition, there may be more or fewer parts to the message, and in different order, than what is shown in this example. There may also be different messages to convey than what this example shows.

In one or more embodiments of the invention, the alert exclamation (802) is configured to notify the user that an important announcement follows. In one embodiment of the invention, the alert exclamation (802) may be listed in all capital letters to show emphasis and help catch the attention of the user. In one embodiment of the invention, the alert exclamation (802) may also be followed by an exclamation point. Those skilled in the art will appreciate that other words (e.g., "GREAT NEWS") may be used to indicate an important announcement, and that other enhancements, such as flashing the wording of the alert exclamation (802), using a bright color for the text, adding sound, using some other technique, or any combination thereof may be included.

In one or more embodiments of the invention, the alert message (804) is configured to notify the user the source of the alert and may extract and utilize information in the donation management system (100 of FIG. 1). For example, the alert message (804) may utilize the donation module (124 of FIG. 1) to declare that a milestone has been met or is about to be met. In this example, the alert message (804) notifies the user that, based on an estimate of all deductions for the user to date, the user is close to being able to claim itemized deductions on the tax return for the current year. Specifically, the donation module (124 of FIG. 1) estimates that the user is $300.00 away from reaching that milestone.

In one or more embodiments of the invention, the information statement (806) is configured to provide the user with more information about the alert notification (800) and may extract and utilize information in the donation management system (100 of FIG. 1). For example, the information statement (806) may utilize the donation module (124 of FIG. 1) to help quantify the impact that reaching a milestone may have. In this example, the information statement (806) tells the user that he can save at least $500.00 on his tax bill by claiming itemized deductions instead of standard deductions.

In one or more embodiments of the invention, the acknowledgment (808) is configured to enable the user to acknowledge receipt of the alert notification (800). In this case, the acknowledgment (808) is both a pushbutton, located at the bottom center portion of the alert notification (800), and a "close window" button, located in the upper right corner of the alert notification (800). Those skilled in the art will appreciate that mechanisms other than pushbuttons may be used to enable the attendee to enter his acknowledgment of the alert notification (800).

Figure 8B:
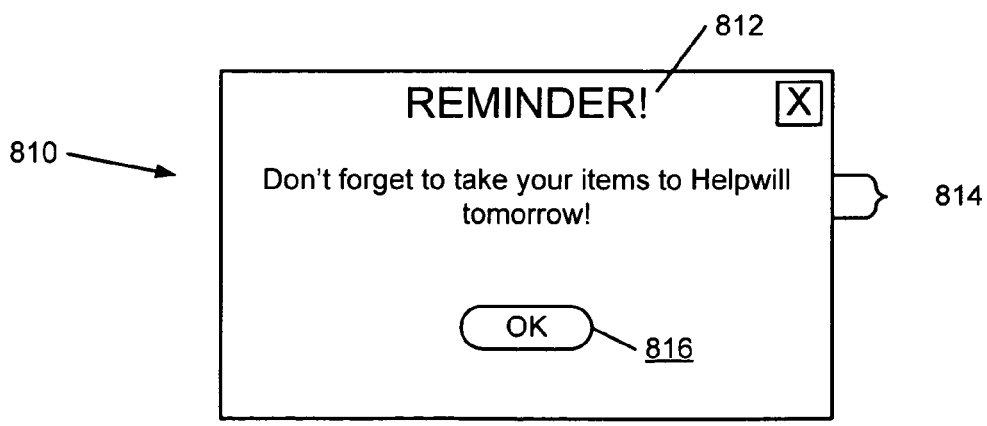

Referring to FIG. 8B, FIG. 8B shows an example of a donation reminder (810) in accordance with one or more embodiments of the invention. The donation reminder (810) may include: (i) a reminder exclamation (812); (ii) a reminder message (814); and (iii) an acknowledgement (816). This example is for explanatory purposes only and is not intended to limit the scope of the invention. Other messages may be shown, both for the circumstance of this example as well as for other events. In addition, there may be more or fewer parts to the message, and in different order, than what is shown in this example. There may also be multiple messages to convey what this example shows. As previously discussed, the reminder message may appear on the toolbox menu (as shown in FIG. 5B), in a calendar system, in some other system, or any combination thereof.

In one or more embodiments of the invention, the reminder exclamation (812) is configured to notify the user that a reminder follows. In one embodiment of the invention, the reminder exclamation (812) may be listed in all capital letters to show emphasis and help catch the attention of the user. In one embodiment of the invention, the reminder exclamation (812) may also be followed by an exclamation point. Those skilled in the art will appreciate that other words (e.g., "ATTENTION") may be used to indicate a problem, and that other enhancements, such as flashing the wording of the reminder exclamation (812), using a bright color for the text, and adding sound, may be included.

In one or more embodiments of the invention, the reminder message (814) is configured to remind the user about a pending donation. In one embodiment of the invention, information contained in a reminder record may be extracted from the appropriate reminder record and utilized in the reminder message (814). For example, the reminder message (814) may extract the donation recipient and the donation type from the reminder record. In one embodiment of the invention, the reminder message (814) may also utilize information contained in the user rules. In this example, the reminder message (814) reminds the user that she is to take items to the charity, Helpwill, tomorrow.

In one or more embodiments of the invention, the acknowledgment (816) is configured to enable the user to acknowledge receipt of the reminder message (814). In this case, the acknowledgment (816) is both a pushbutton, located at the bottom center portion of the donation reminder (810), and a "close window" button, located in the upper right corner of the donation reminder (810). Those skilled in the art will appreciate that mechanisms other than pushbuttons may be used to enable the attendee to enter his acknowledgment of the donation reminder (810).

Figure 9:
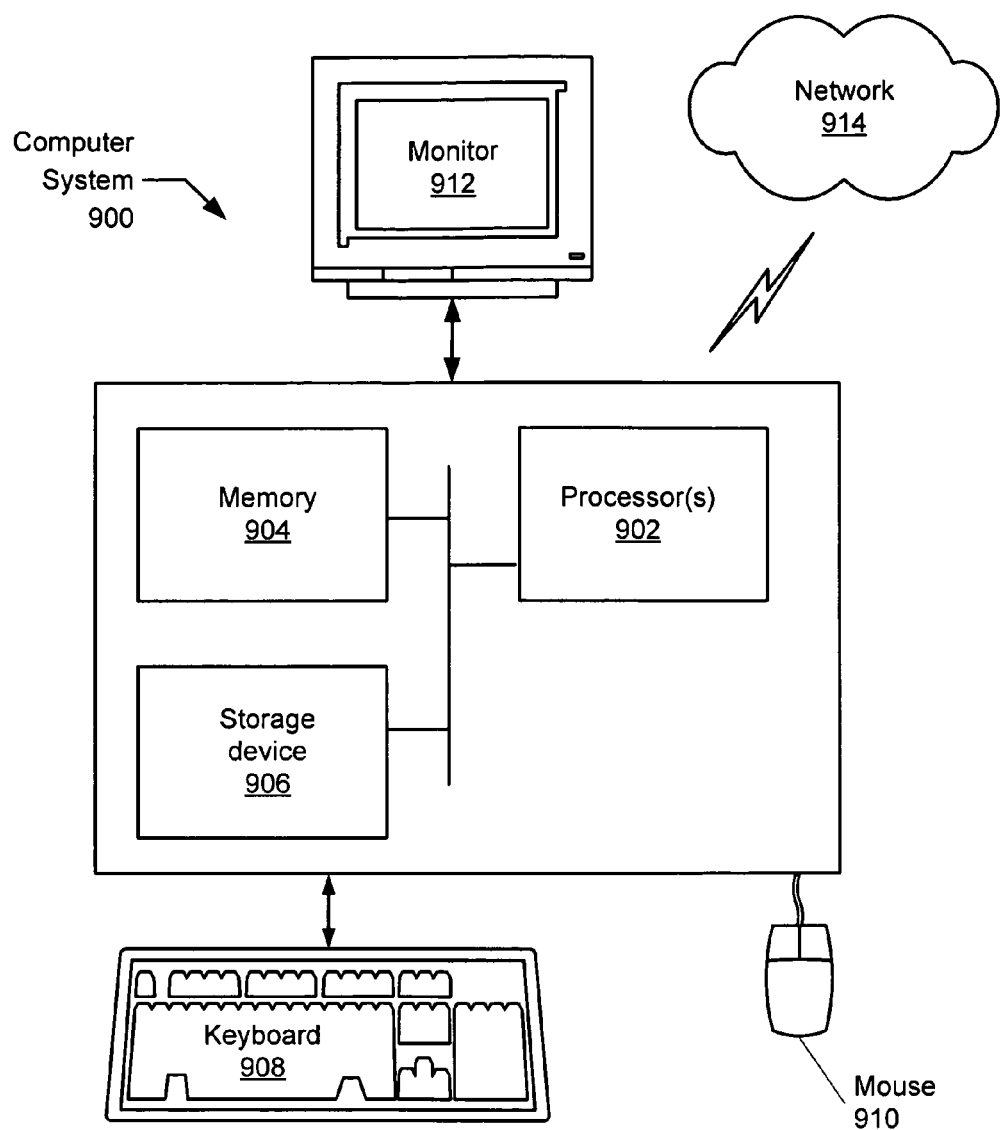
FIG. 9 shows a computer system in accordance with one or more embodiments of the invention.

Embodiments of the invention may be implemented on virtually any type of computer regardless of the platform being used. For example, as shown in FIG. 9, a computer system (900) includes one or more processor(s) (902), associated memory (904) (e.g., random access memory (RAM), cache memory, flash memory, etc.), a storage device (906) (e.g., a hard disk, an optical drive such as a compact disk drive or digital video disk (DVD) drive, a flash memory stick, etc.), and numerous other elements and functionalities typical of today's computers (not shown). The computer (900) may also include input means, such as a keyboard (908), a mouse (910), or a microphone (not shown). Further, the computer (900) may include output means, such as a monitor (912) (e.g., a liquid crystal display (LCD), a plasma display, or cathode ray tube (CRT) monitor). The computer system (900) may be connected to a network (914) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means may take other forms. Generally speaking, the computer system (900) includes at least the minimal processing, input, and/or output means necessary to practice embodiments of the invention.

Further, those skilled in the art will appreciate that one or more elements of the aforementioned computer system (900) may be located at a remote location and connected to the other elements over a network. Further, embodiments of the invention may be implemented on a distributed system having a plurality of nodes, where each portion of the invention (e.g., the donation management system, browser application) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A method for managing charitable donations of a donor, comprising:
   receiving donation information associated with a charitable donation of the donor from a browser extension of a browser application, wherein the browser application is executing on a user system of the donor, and wherein the browser extension obtains the donation information independent of web content presented in the browser application;
   receiving, from a tax preparation entity using a tax preparation application executing on a tax preparation system of the tax preparation entity, an information request for the donation information of the donor;
   in response to the information request, sending the donation information of the donor through the tax preparation application to the tax preparation entity, wherein the donation information is used by the tax preparation entity to generate tax documentation for the donor;
   sending an address of a donation recipient and a starting location to a global positioning application, wherein the donation recipient is associated with the charitable donation;
   receive, from the global positioning application, a set of directions from the starting location to the address of the donation recipient; and
   sending the set of directions to the browser application, wherein the set of directions are presented to the donor.

2. The method of claim 1, wherein the donation information comprises a receipt, a donation recipient, a donation type, and a donation value for the charitable donation.

3. The method of claim 2, wherein the donation information further comprises an image of an item, wherein the item is the charitable donation.

4. The method of claim 1, wherein the donation value is obtained from a donation authority application and stored with the donation information.

5. The method of claim 1, further comprising:
   receiving a reminder request to generate a reminder associated with a future charitable donation, wherein the reminder comprises a date and future charitable donation information; and
   sending the future charitable donation information in the reminder record to the donor on the date.

6. The method of claim 1, further comprising:
   monitoring the charitable donations to determine if a donation event is satisfied;
   determining that the donation event is satisfied; and
   notifying the donor of the donation event.

7. The method of claim 1, further comprising:
   receiving a quantity of miles for the set of directions to the donation recipient from the global positioning application; and
   storing the quantity of miles for the charitable donation.

8. The method of claim 1, wherein the donation information is obtained from a donation recipient application.

9. The method of claim 1, wherein interactions with the browser application occur through the browser extension of the browser application.

10. The method of claim 1, wherein the donation information is stored in a format supported by a plurality of applications.

11. A system for managing charitable donations of a donor comprising:
    an application interface operatively connected to a browser extension of a browser application, wherein the browser application is executing on a user system of the donor, the application interface configured to:
       receive donation information associated with a charitable donation of the donor from the browser extension, wherein the browser extension obtains the donation information independent of web content presented in the browser application;
       receive, from a tax preparation entity using a tax preparation application executing on a tax preparation system of the tax preparation entity, an information request for donation information of the donor;
       in response to the information request, send the donation information of the donor through the tax preparation application to the tax preparation entity, wherein the donation information is used by the tax preparation entity to generate tax documentation for the donor;
       send an address of a donation recipient and a starting location to a global positioning application, wherein the donation recipient is associated with the charitable donation;
       receive, from the global positioning application, a set of directions from the starting location to the address of the donation recipient; and
       send the set of directions to the browser application, wherein the set of directions are presented to the donor; and
    a data repository configured to store the donation information.

12. The system of claim 11, further comprising a security module configured to determine that the donor is authorized to access the browser application.

13. The system of claim 11, wherein the application interface is further configured to:
    send a valuation request to a donation authority application for a valuation of the charitable donation; and
    receive the valuation of the charitable donation from the donation authority application.

14. The system of claim 11, wherein the application interface is further configured to:
    receive a quantity of miles for the set of directions to the donation recipient from the global positioning application; and
    store the quantity of miles for the charitable donation.

15. The system of claim 11, wherein the application interface is further configured to:
    receive the donation information from a donation recipient application.

16. The system of claim 11, wherein the application interface is further configured to:
    interact with the browser application through the browser extension of the browser application.

17. The system of claim 11, wherein the application interface is further configured to:
    receive a reminder request to generate a reminder associated with a future charitable donation, wherein the reminder comprises a date and future charitable donation information; and
    send the future charitable donation information to the donor on the date.

18. The system of claim 11, further comprising an analysis module configured to:
    monitor the charitable donations to determine if a donation event is satisfied;
    determine that the donation event is satisfied; and
    notify the donor of the donation event.

19. A non-transitory computer readable medium, embodying instructions executable by a computer for managing charitable donations of a donor, the instructions comprising functionality to:
    receive donation information associated with a charitable donation of the donor from a browser extension of a browser application, wherein the browser application is executing on a user system of the donor, and wherein the browser extension obtains the donation information independent of web content presented in the browser application;
    receive, from a tax preparation entity using a tax preparation application executing on a tax preparation system of the tax preparation entity, an information request for the donation information of the donor;
    in response to the information request, send the donation information of the donor through the tax preparation application to the tax preparation entity, wherein the donation information is used to generate tax documentation for the donor by the tax preparation entity;
    send an address of a donation recipient and a starting location to a global positioning application, wherein the donation recipient is associated with the charitable donation;
    receive, from the global positioning application, a set of directions from the starting location to the address of the donation recipient; and
    send the set of directions to the browser application, wherein the set of directions are presented to the donor.

20. The non-transitory computer readable medium of claim 19, wherein the donation information comprises a receipt, a donation recipient, a donation type, and a donation value for the charitable donation.

21. The non-transitory computer readable medium of claim 20, wherein the donation information further comprises an image of an item, wherein the item is the charitable donation.

22. The non-transitory computer readable medium of claim 19, wherein the donation value is obtained from a donation authority application and stored with the donation information.

23. The non-transitory computer readable medium of claim 19, wherein the instructions further comprise functionality to:
    receive a reminder request to generate a reminder associated with a future charitable donation, wherein the reminder comprises a date and future charitable donation information; and
    send the future charitable donation information to the donor on the date.

24. The non-transitory computer readable medium of claim 19, wherein the instructions further comprise functionality to:
    monitor the charitable donations to determine if a donation event is satisfied;
    determine that the donation event is satisfied; and
    notify the donor of the donation event.

25. The non-transitory computer readable medium of claim 19, wherein the instructions further comprise functionality to:
    receive a quantity of miles for the set of directions to the donation recipient from the global positioning application; and
    store the quantity of miles for the charitable donation.

26. The non-transitory computer readable medium of claim 19, wherein the donation information is obtained from a donation recipient application.

27. The non-transitory computer readable medium of claim 19, wherein interactions with the browser application occur through the browser extension of the browser application.

28. The non-transitory computer readable medium of claim 19, wherein the donation information is stored in a format supported by a plurality of applications.

* * * * *